United States Patent
Stein

(10) Patent No.: US 6,971,072 B1
(45) Date of Patent: Nov. 29, 2005

(54) REACTIVE USER INTERFACE CONTROL BASED ON ENVIRONMENTAL SENSING

(75) Inventor: Mitchell Jay Stein, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 09/311,432

(22) Filed: May 13, 1999

(51) Int. Cl.[7] .............................. G06F 3/00
(52) U.S. Cl. .................. 715/866; 715/788; 715/727; 715/764; 715/765; 715/800; 382/267
(58) Field of Search .................. 345/700, 727, 345/764, 765, 866, 756; 715/700, 727, 764, 866, 756, 788, 800, 765; 382/276

(56) References Cited

U.S. PATENT DOCUMENTS

| | | | |
|---|---|---|---|
| 4,144,596 A | | 3/1979 | MacFarlane et al. |
| 5,565,888 A | * | 10/1996 | Selker .................. 345/146 |
| 5,831,597 A | * | 11/1998 | West et al. ............. 345/163 |
| 5,920,309 A | * | 7/1999 | Bisset et al. ........... 345/173 |
| 5,956,035 A | * | 9/1999 | Sciammarella et al. .. 345/841 |
| 6,009,210 A | * | 12/1999 | Kang ................... 382/276 |
| 6,053,814 A | * | 4/2000 | Pchenitchnikov et al. .... 463/36 |
| 6,100,889 A | * | 8/2000 | Sciammarella et al. ..... 345/841 |
| 6,184,876 B1 | * | 2/2001 | Miller ................... 345/302 |
| 6,359,632 B1 | * | 3/2002 | Eastty et al. ............ 345/716 |

* cited by examiner

Primary Examiner—Ba Huynh
Assistant Examiner—M Tran
(74) Attorney, Agent, or Firm—Ryan, Mason & Lewis, LLP

(57) ABSTRACT

Methods and apparatus for reactively controlling one or more user interfaces associated with a device based on sensed conditions in an environment associated with at least one of the user interfaces are provided. A method of controlling at least one user interface associated with a device includes sensing conditions in an environment which includes the at least one user interface of the device. Then, the method includes presenting data at the at least one user interface as a function of the sensed conditions. For example, the sensing step may include detecting a proximity of a user with respect to the user interface such that the presenting step includes presenting data at the user interface as a function of the detected proximity. The proximity of the user to the user interface may be measured as a distance value between the user and the user interface such that data is presented at the user interface in a different manner or mode based on the distance value. The methods and apparatus also provide for detecting the identity of the user.

26 Claims, 4 Drawing Sheets

REACTIVE USER INTERFACE CONTROL BASED ON ENVIRONMENTAL SENSING

FIELD OF THE INVENTION

The present invention relates generally to user interaction with processor-based devices and, more particularly, to methods and apparatus for reactively controlling one or more user interfaces of a device based on the physical environment such as user proximity to at least one of the user interfaces.

BACKGROUND OF THE INVENTION

It is well known that user interfaces associated with conventional processor-based devices allow users to interact with such devices and application programs running thereon. For instance, a personal computer is one example of a processor-based device whose user interfaces may include a visual display, audio speaker, keyboard, mouse, etc. Such user interfaces permit the personal computer to output data, e.g., information and results, associated with the computer and/or applications to the user (e.g., via the display and speaker) and permit the user to input data, e.g., information and queries, to the computer and/or application (e.g., via the keyboard and mouse).

However, it is also known that such conventional user interfaces require the user to be in close physical proximity to the interfaces in order to perceive output information and results from the device or enter information and queries to the device. For instance, data presented on a visual display of a computer is typically sized by the device based on the assumption that the user is within a few feet of the screen and thus can adequately read text or view images thereon. Also, an input device such as a keyboard or mouse requires the user to be in close proximity since such devices require physical contact in order for the user to use them.

A significant problem arises, however, when a user of the processor-based device is not in close physical proximity to the interfaces. In such cases, the user may be unable to view data on the screen and/or may be unable to enter data on the input devices. Important information or results may be missed, as well as opportunities to enter information or queries. While a user may be able to hear audio information from the processing device at a distance outside of the user's adequate visible range, conventional devices and/or applications running on the devices are unaware of the user's location and therefore have no ability to know when an audible output would be preferable over a visual output. In any case, conventional applications are usually equipped to exclusively output either visual data or audio data.

There have been attempts made at providing simple processor-based and other devices with the ability to detect the proximity of an object in order to perform some function. For example, proximity detection is implemented in some sink faucets and bathroom urinals or toilets. In such cases, an infrared detector is used to detect whether an object, presumably a person, has moved into and/or out of a particular physical range with respect to the device. The result of such detection causes the sink faucet to turn on or off and, in the case of the urinal or toilet, to flush. Automatic door openers and burglar alarms generally work on the same principal. In all of these cases, however, proximity is used only as a trigger to initiate a simple action, e.g., turn on water, open a door, sound an alarm, etc. In none of these cases does the behavior of the system vary in a multiple-step or continuous manner as a function of proximity. Further, in none of these systems does the system's response vary in an arbitrarily complex manner. Still further, these conventional systems are basically concerned with the presence or absence of a person within a certain range, however, none of the systems discriminate with respect to the identity of the person.

SUMMARY OF THE INVENTION

The present invention provides methods and apparatus for reactively controlling one or more user interfaces associated with a device based on sensed conditions in an environment associated with at least one of the user interfaces.

In one aspect of the invention, a method of controlling at least one user interface associated with a device includes sensing conditions in an environment which includes the at least one user interface of the device. Then, the method includes presenting data at the at least one user interface as a function of the sensed conditions. For example, in an illustrative embodiment of the invention, the sensing step may include detecting a condition such as the proximity of a user with respect to the user interface such that the presenting step includes presenting data at the user interface as a function of the detected proximity. The proximity of the user to the user interface may be measured as a distance value between the user and the user interface such that data is presented at the user interface in a different manner or mode based on the distance value. Other examples of sensed environmental conditions may include, but are not limited to: (i) light level; (ii) number of persons in the area; (iii) sound level; (iv) device or system state; (v) the quantity and/or type of data that is to be presented to the user (e.g., emergency message as opposed to a non-emergency message). In each case, the invention presents data at the one or more user interfaces as a function of the sensed condition.

In a further illustrative embodiment, the device may include a visual display and at least one audio speaker. Thus, when the user's location and thus distance from at least one of the interfaces changes, modes of data presentation at the interfaces reactively change. For instance, as a user moves farther away from the visual display, any data (e.g., text, images, video, etc.) on the screen may be increased in size so that it is more readable and/or viewable from the increased distance. Also, the content detail associated with the data may be adjusted to be finer or coarser, that is, less detail is presented when the user is farther away as compared to the more detail being presented when the user is closer. When a user reaches a point where he is out of sight of the display or out of a reasonable viewing range, the presentation mode switches to audio and the data is then audibly output so that the user can still receive some or all of the data by listening to it rather than viewing it. Switching of presentation modes may be based on the presence of the user in predetermined detection zones or ranges (i.e., discrete) or based on incremental distance (i.e., continuous).

It is to be appreciated that the sensing performed according to the invention is not limited to any particular sensing technology. That is, any conventional sensors for performing physical context sensing of an environment around the user interface may be employed. For example, one or more conventional sensors that employ the following technologies may be used: (i) passive or active infrared proximity detection; (ii) video detection; (iii) speech recognition; (iv) weight sensors; (v) light sensors; (vi) capacitance sensing; (vii) electric field shunting (viii) a discrete activation switch (e.g., door switch); (ix) electric current draw (e.g., a light switch or appliance goes on drawing current that is detectable); (x) temperature detection; (xi) magnetic sensing; and/or (xii) inductive sensing. However, these technologies and approaches are merely illustrative in nature and not intended to be limiting. One of ordinary skill in the art will contemplate other implementations given the inventive teachings herein.

In another aspect of the invention, the present invention provides for detecting the identity of the particular person that enters the sensing environment. Given the identity of the person, the device can present data in preferred formats as previously specified by the user. Again, the invention is not limited to any particular implementation for identifying the user. For example, the user's identity may be determined non-biometrically by comparing a spoken password or phrase to a stored database of passwords or phrases. Alternatively, the user may be biometrically identified by comparing a biometric attribute, e.g., voice pattern, contemporaneously extracted when the user enters the environment to a stored database of such biometric attributes. Examples of biometric attributes may include eye recognition, speech recognition, face recognition, physical dimension, weight, hand shape, profile, etc. Further, sensors that detect the user's proximity may also provide the necessary information for identifying the user. An example of this may be eye recognition where the video input captured by a video camera may be used by the invention to not only identify the user based on retinal pattern comparison, as is known, but also compute a proximity value by measuring the distance between the center of the person's eyeballs, as is also known. However, independent sensors may be used to provide the proximity and identity detection functions.

Various exemplary applications of the invention are apparent given the teachings herein. For example, in a telephony application, the invention may be implemented to control a visual display for displaying caller identification information. Depending where the user is positioned with respect to the display, the invention provides for displaying the information in different detail content levels and sizes, so that it may be more readily perceived by the user. When the user is some distance away or out of sight of the display and an audio speaker is provided, the information may be audibly output.

Advantageously, user interaction can be optimized based on proximity to the device. The invention automatically provides high data viewability without user-explicit control. The behavior discontinuity allows the device to retain its usability even when the user is too far away to see it's display.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that the term "data" as used herein is not limited to any particular format. For instance, "data" may include text, images, video, audio, etc. Also, the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., keyboard, for inputting data to the processing unit, and/or one or more output devices, e.g., CRT display and/or printer, for providing results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 1:
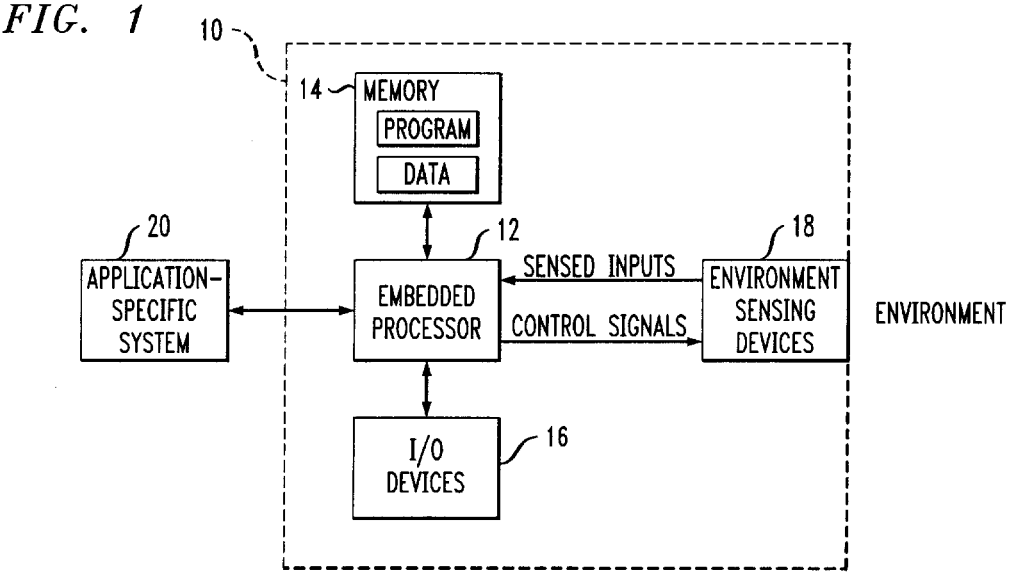
FIG. 1 is a block diagram illustrating apparatus for reactively controlling one or more user interfaces according to an embodiment of the invention.

Referring initially to FIG. 1, a block diagram of a device 10 which implements apparatus for reactively controlling one or more user interfaces according to the invention is shown. Particularly, the device 10 includes an embedded processor 12 operatively coupled to memory 14, I/O devices 16 and environment sensing devices 18. The I/O devices may include output devices such as a visual display and/or an audio speaker which comprise the "user interfaces" that are to be reactively controlled according to the invention. It is to be appreciated that the user interface may include other types of output devices (e.g., lights, etc.) and thus the invention is not limited to any example given herein. Also, the I/O devices may include input devices such as a keyboard, a keypad, a mouse, etc. The processor is referred to as an "embedded" processor 12 because it is preferably mounted internal to the device 10. The memory 14 stores programs including one or more programs for implementing the methodology of the invention explained herein, as well as data generated in accordance therewith (e.g., state information associated with the sensed inputs received from the environment sensing devices 18) and any data necessary for operations associated with device 10.

It is to be appreciated that the device 10 may be any one of a variety of processor-based devices. For example, device 10 may be in the form of a personal computer or laptop computer. It may also be in the form a processor-based phone, e-mail or other information access system. The invention is not limited to any particular form for device 10.

As shown, the processor 12 is operatively coupled to an application-specific system 20. The system 20, while shown external to device 10, may alternatively be internal (in part or in whole) to device 10 depending on the particular system 20, e.g., the system 20 may be executed and controlled by processor 12. The application-specific system 20 may vary depending on the form that device 20 takes. For instance, if device 10 is part of a telephony system for providing caller identification (ID), then system 20 may be a conventional telephony system such that data, e.g., caller ID information for an incoming call to a user, is provided to processor 12. Depending on sensed input data from the sensing devices 18, the processor 12 selects and implements a data presentation mode for presenting all or part of the data from the system 20 to the user in the environment.

By way of further example, the system 20 may be a specific application program or programs responsible for running one or more processes within a building or residence. In such case, the data adaptively presented at the user interfaces of device 10 as a function of sensed conditions in the environment is data specific to the one or more processes. Still further, the device 10 may be a personal computer or laptop and the system 20 may be an information network such as, for example, the Internet. The teachings of the invention are not limited to the system 20 or the particular form of device 10.

Similarly, as previously mentioned, the form of the one or more sensing devices 18 does not limit the invention. The sensing devices may incorporate, but are not limited to, one or more of the following types of sensing technologies: (i) passive or active infrared proximity detection; (ii) video detection; (iii) speech recognition; (iv) weight sensors; (v) light sensors; (vi) capacitance sensing; (vii) electric field shunting (viii) a binary activation switch (e.g., door switch); (ix) electric current draw (e.g., a light switch or appliance goes on drawing current that is detectable); (x) temperature detection; (xi) magnetic sensing; and/or (xii) inductive sensing. An illustrative embodiment will be given below including an active infrared sensor for detecting proximity of a user and a speech recognition system for detecting the identity of the user. However, as already mentioned, a single sensing device such as an eye recognition system may be used to perform both proximity detection and identification.

It is also to be appreciated that the type of user interface and environmental sensing device employed in the particular application may necessitate implementing conventional signal canceling techniques. For example, in an embodiment where the user interface includes an audio speaker and one of the sensing devices detects audible sounds (voice, ambient noises, etc.) in the environment, the invention may implement signal canceling techniques to avoid an uncontrolled feedback loop. For instance, if one function of the audio sensing device is to detect the level of sound in the environment so that the speaker volume can be adjusted (e.g., raised if environment becomes noisy and lowered when noise level subsides), then the device may implement a signal canceler so that the audio output by the speaker itself is subtracted from the detected environment noise measured by the sensor. If this were not done, then each time the device output audio at the speaker, the sensor would detect the increased audio level in the environment and the device would compensate by raising the speaker volume. This would result in an uncontrolled open feedback loop causing the device to continuously raise the volume at the speaker. By employing signal canceling as is well-known in the art, this situation is avoided. The same situation can occur if the user interface includes one or more lights and one of the sensors is a light level sensor. Similar canceling techniques can be employed here as well.

While certain components associated with the device 10 are illustratively described as being internal to device 10, it is to be appreciated that this does not only mean physically situated in the device body but more generally can mean operatively associated with the device 10. For example, the portion of the device that is in the sensing environment may only be the user interfaces and the sensing devices, while the processor and memory are operatively coupled to the interfaces and sensors but remotely located with respect thereto.

Figure 2:
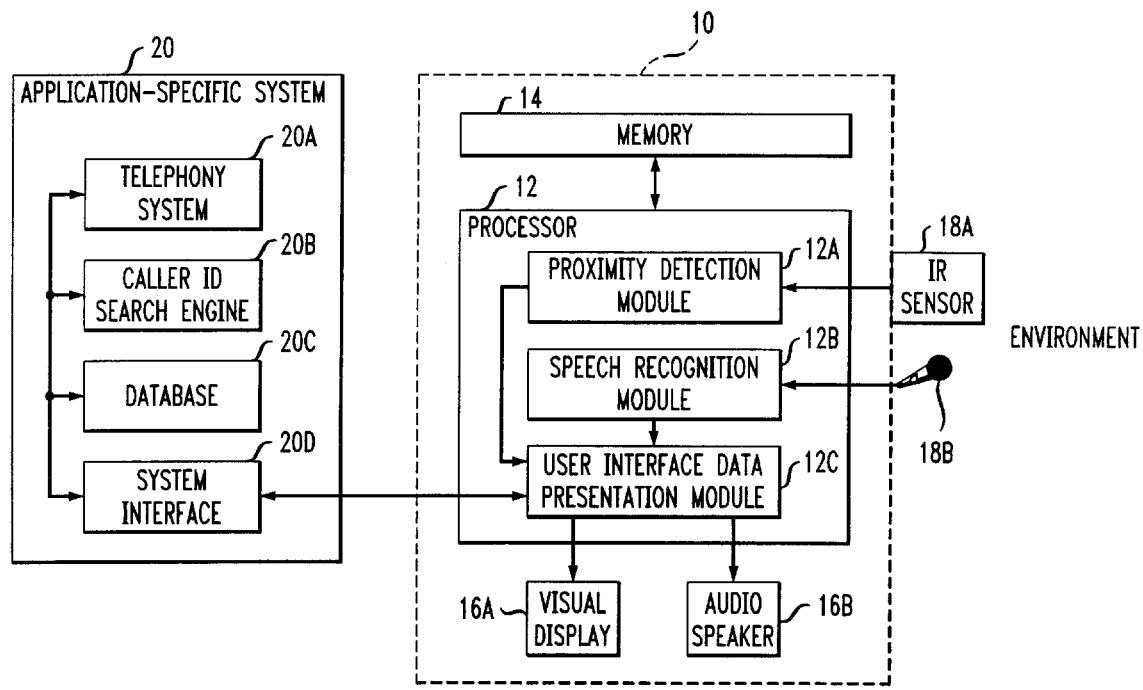
FIG. 2 is a block diagram illustrating apparatus for reactively controlling one or more user interfaces according to another embodiment the invention.

Referring now to FIG. 2, a block diagram illustrating apparatus for reactively controlling one or more user interfaces according to another embodiment the invention is shown. The illustrative embodiment shown in FIG. 2 includes an active infrared (IR) proximity sensor 18A and a microphone 18B as environment sensing devices. As will be explained, the IR proximity sensor 18A is used to provide proximity detection of a user within the environment. The microphone 18B is used in accordance with speech recognition techniques to identify the user. It is to be appreciated that the active IR sensor may be an active IR sensor commercially available from Sharp Corporation and identified as a "distance measurement sensor" having a part no. GP2D02. Further, in this embodiment, the device 10 includes a visual display 16A and an audio speaker 16B as user interfaces. Also, the application-specific system 20 is a caller ID system associated with a conventional telephony system. As shown, the system 20 includes a telephony system 20A, caller ID engine 20B, database 20C and system interface 20D. The system 20A represents the equipment and or software for processing incoming calls, the engine 20B searches database 20C for the caller's name and number based on the caller ID specification, and the system interface 20D sends this information (e.g., caller's name and number) to the processor 12 as application-specific data.

In accordance with this embodiment of the invention, the processor 12 loads one or more programs in the form of modules of software code from memory 14 and executes instructions associated therewith accordingly. As shown, the processor runs a proximity detection module 12A, a speech recognition module 12B, and a user interface data presentation module 12C. The operation of each of these modules according to the invention will now be explained in accordance with the flow diagram of FIG. 3.

Figure 3:
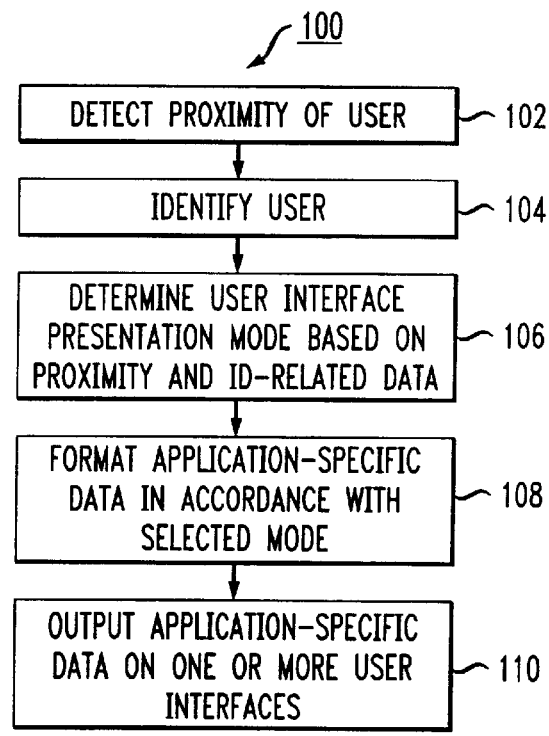
FIG. 3 is a flow diagram illustrating a method of reactively controlling one or more user interfaces according to an embodiment the invention.

Referring to FIG. 3, an illustrative method 100 for reactively controlling the user interfaces based on the proximity and identity of the user is shown. While the steps are illustrated sequentially, it should be understood that the steps do not necessarily need to be performed in this order, i.e., they can be performed in other orders and/or some steps may be performed concurrent with other steps.

In step 102, the proximity of the user with respect to the IR sensor 18A is detected. This is accomplished by the IR sensor 18A detecting a disturbance in the IR energy output from the sensor. The proximity detection module 12A receives input data from the IR sensor 18A. The input data from the sensor 18A is representative of the user's proximity to the sensor 18A based on the sensed IR energy disturbance. The module 12A assigns a distance value to the detected proximity of the user. It is to be understood that the function of the module may be incorporated into the infrared sensor. That is, the data received from the sensor may be the actual value representing the distance from the sensor at which the user is currently located. This approach would preclude the need to have a separate module for generating the distance measure running in the processor. That is, the IR sensor would then provide the distance value directly to module 12C. It is also to be understood that the sensor 18A is preferably placed in close proximity to the visual display 16A so that the proximity detected by the sensor with respect to the user also represents the proximity of the user with respect to the visual display 16A. This is because the changes to the presentation of data at the display are based on the distance detected between the user and the display.

In step 104, the identity of the user is detected. In the embodiment in FIG. 2, user identification is performed using the microphone 18B and the speech recognition module 12B. The microphone 18B picks up speech uttered by the user as the user enters the environment. The speech recognition module 12B extracts a voice pattern from the speech signal received from the microphone and compares it to a previously stored database of voice patterns. The person who entered the environment is assumed to be the person from the database whose voice pattern results in the closest match to the contemporaneously extracted voice pattern. Any conventional speech recognition system may be used, to accomplish this identification. Also, as previously mentioned, identification may be accomplished in any number of ways using biometric and/or non-biometric techniques. In any case, the module 12B provides data representing the user's identity.

Next, in steps 106 and 108, the user interface data presentation module 12C determines what data presentation mode to implement and then formats application-specific data (received for display in accordance with system 20) according to the selected mode. The module receives the user proximity data and the user identity related data from modules 12A and 12B, respectively.

With the distance value assigned to the proximity of the user, the module 12C determines which data presentation mode to implement (step 106). The following is an illustrative pseudo-code algorithm for performing this step:

Case of
  user_close
    display data using fine_detail and small_size
  user_nearby
    display data using medium_detail and medium_size
  user_far_away_insight
    output audible alert
    display data using coarse_detail and large_size
  user_out-of-sight
    output audio data Accordingly, when the user is determined to be "close," based on the measured distance value, the application-specific data is formatted by module 12C to include fine content detail and small character size (i.e., fine mode). When the user is determined to be "nearby," based on the measured distance value, the application-specific data is formatted to include medium content detail and medium character size (i.e., medium mode). When the user is determined to be relatively "far away," based on the measured distance value, the application-specific data is formatted to include coarse content detail and large character size (i.e., coarse mode). Also, in coarse mode, the device may sound an audible beep from the speaker 16B to alert the user that data is on the screen. When the user is determined to be relatively "out-of-sight," based on the measured distance value, the application-specific data is formatted as audio data and output at the speaker 16B (i.e., audio mode). The module 12C may include a conventional text-to-speech system for converting the application-specific data to an audible representation and/or a conventional audio playback system to playback previously recorded and stored audio messages associated with the application-specific data.

With the user identity data, the module 12C may search a previously stored (e.g., in memory 14) database of user presentation preferences (e.g., color, size, format, gender and/or other vocal characteristics of the voice output at the audio speaker, etc.) and format the data in accordance with these preferences. It is to be appreciated that the user's preferences can also dictate the degree of content detail and character size in the above presentation modes.

Determination as to whether the user is "close," "nearby," "far away insight," or "out-of-sight," depends on what definition is given to such proximity states. For example, the invention may detect the proximity of the user based on zones. That is, the distance value is computed, as explained above, and the distance value is checked against predetermined distance zones to determine which zone the user is in. From the identified zone (e.g., "close," "nearby," "far away insight," or "out-of-sight"), the module 12C selects the corresponding presentation mode. Of course, discrete detection zones are not required. That is, incremental distance values may be continuously checked to determine and implement the appropriate presentation mode. Lastly, in step 110, the user interface data presentation module 12C then outputs the formatted application-specific data to the appropriate user interface.

Figure 4:
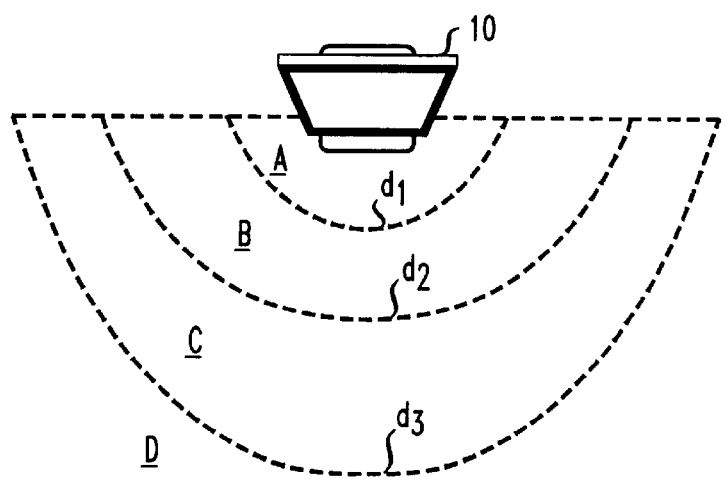
FIG. 4 is a diagram illustrating proximity zone detection according to an embodiment of the invention.

Referring now to FIGS. 4 and 5A through 5D, an example is provided which illustrates the correspondence between proximity zone detection and data presentation modes according to the exemplary embodiment described above. Thus, FIG. 4 shows a device 10 having one or more environment sensing devices 18 (e.g., IR sensor 18A) and zones A, B, C, and D that are specified for locating the proximity of the user with respect to one or more of the device's user interfaces. Consistent with the example above, it is to be understood that zone A may represent the distance range "close," defined by the area encompassed between the interface itself and radial distance $d_1$. Zone B may represent the distance range "nearby," defined by the area encompassed between radial distance $d_1$ and radial distance $d_2$. Zone C may represent the distance range "far away insight," defined by the area encompassed between radial distance $d_2$ and radial distance $d_3$. Zone D may represent the distance range "out-of-sight," defined by the area encompassed beyond radial distance $d_3$. It is to be appreciated that the shapes of the proximity or sensing zones are based on the sensor used. Therefore, FIG. 4 is intended only to illustrate one example of zones and not intended to limit the scope of the invention.

Figure 5A:
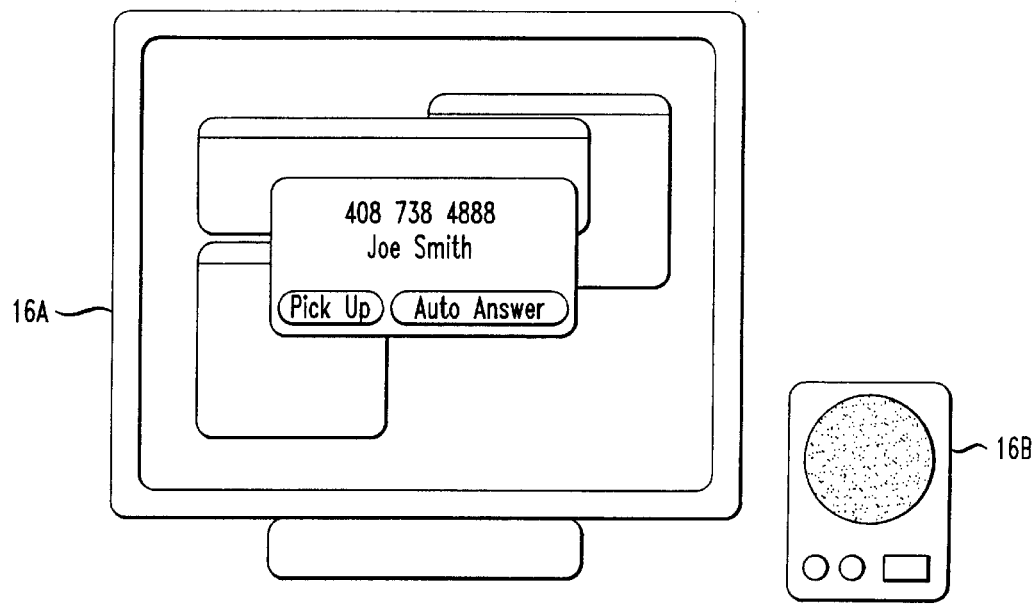
FIGS. 5A through 5D are diagrams illustrating various presentation modes on user interfaces according to an embodiment of the invention.
Figure 5B:
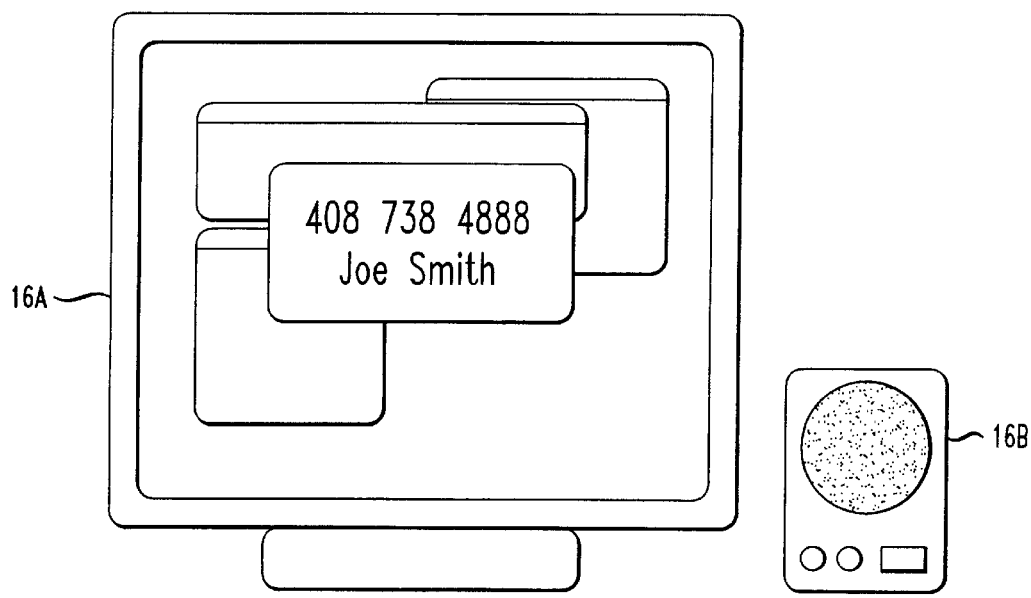
Figure 5C:
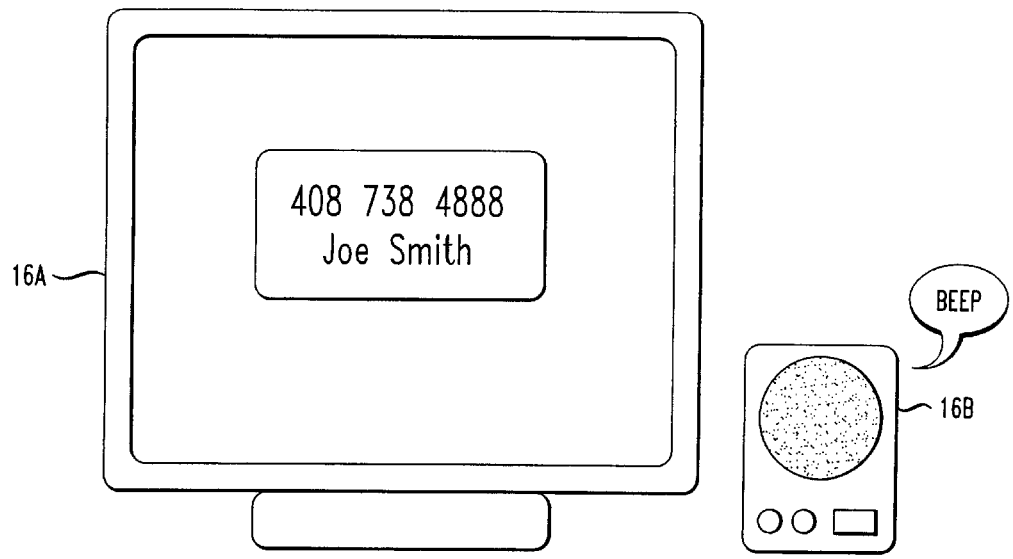
Figure 5D:
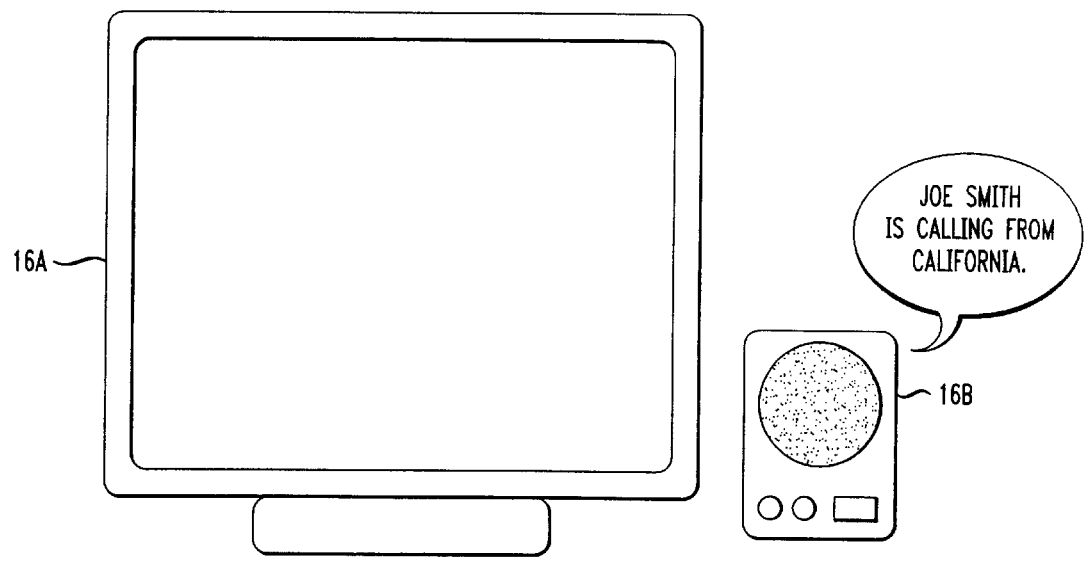

Accordingly, referring now to FIGS. 5A through 5D, examples of caller ID data are shown associated with presentation modes corresponding to the zone the user is detected to be in. FIG. 5A shows an example of fine content detail and small character size that might be presented to a user in zone A when a call comes in. FIG. 5B shows an example of medium content detail and medium character size that might be presented to a user in zone B when the call comes in. Notice that some of the content is removed ("Pick Up" and "Auto Answer") and the character size is larger in FIG. 5B as compared to FIG. 5A. FIG. 5C shows an example of coarse content detail and large character size that might be presented to a user in zone C when the call comes in. Notice that some of the content behind the name and number of the caller is removed and the character size is larger in FIG. 5C as compared to FIG. 5B. Also, notice that the audio speaker 16B presents an audible beep to alert the user of the caller ID data. Lastly, FIG. 5D shows an example of the audio mode in which data is audibly presented to a user in zone D when the call comes in. While no data is shown as being displayed on the visual display 16A in zone D, data may still be presented in some format.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of controlling at least one user interface associated with a device, the method comprising the steps of:

sensing conditions in an environment which includes the at least one user interface of the device;

presenting data at the at least one user interface, wherein presentation of the data varies between two or more presentation modes as a function of changes in the sensed conditions such that the presentation mode corresponds to the sensed condition in a manner which enhances the ability of a user to perceive the data;

wherein the sensing step includes detecting a proximity of a user with respect to the at least one user interface and the presenting step further includes presenting data as a function of the detected proximity of the user; and wherein the sensing step further includes detecting an identity of the user in the environment based on at least one attribute associated with the user.

2. The method of claim 1, wherein the at least one attribute is a biometric attribute.

3. Apparatus for controlling at least one user interface associated with a device, the apparatus comprising:

at least one sensor which senses conditions in an environment that includes the at least one user of the device;

at least one processor coupled to the at least one sensor and operative to present data at the at least one user interface, wherein presentation of the data varies between two or more presentation modes as a function of changes in the sensed conditions such that the presentation mode corresponds to the sensed condition in a manner which enhances the ability of a user to perceive the data;

wherein the at least one sensor detects a proximity of a user with respect to the at least one user interface and the at least one processor presents data as a function of the detected proximity of the user;

wherein the at least one user interface is a visual display; and wherein the at least one processor performs the sensing operation by detecting an identity of the user in the environment based on at least one attribute associated with the user.

4. The apparatus of claim 3, wherein the at least one attribute is a biometric attribute.

5. The method of claim 4, wherein a size associated with the presented data increases as a distance measure assigned to the detected proximity of the user increases.

6. The method of claim 5, wherein a size associated with the presented data decreases as a distance measure assigned to the detected proximity of the user decreases.

7. The method of claim 4, wherein a size associated with the presented data decreases as a distance measure assigned to the detected proximity of the user decreases.

8. The method of claim 3, wherein the formatting step further includes adjusting content detail assioiciated with the data presented on the visual display as a function of the detected proximity of the user.

9. The method of claim 2, wherein a second user interface of the device is an audio speaker.

10. The method of claim 1, wherein the detecting step further includes determining whether the user is one of two or more zones with respect to the at least one user interface and the presenting step further includes presenting the data in different modes depending on which zone the user is determined to be in.

11. The method of claim 10, wherein at least one user interface is a visual display and the presenting step includes selecting different sizes for the presented data depending on which zone the user is determined to be in.

12. The method of claim 11, wherein a second user interface is an audio speaker and the presenting step includes causing an audible representation of the data to be presented at the audio speaker depending on which zone the user is determined to be in.

13. The method of claim 1, wherein the at least one attribute is a biometric attribute.

14. Apparatus for controlling at least one user interface associated with a device, the apparatus comprising:

at least one sensor which senses conditions in an environment that includes the at least one user interface of the device; and at least one processor coupled to the at least one sensor and operative to present data at the at least one user interface, wherein presentation of the data varies between two or more presentation modes as a function of changes in the sensed conditions such that the presentation mode corresponds to the sensed condition in a manner which enhances the ability of a user to perceive the data;

wherein the at least one sensor detects a proximity of a user with respect to the at least one user interface and the at least one processor presents data as a function of the detected proximity of the user;

wherein the at least one user interface is a visual display; and wherein the at least one processor performs the sensing operation by detecting an identity of the user in the environment based on at least one attribute associated with the user.

15. The apparatus of claim 14, wherein the at least one sensor detects a proximity of a user with respect to the at least one user interface and the at least one processor presents data as a function of the detected proximity of the user.

16. The apparatus of claim 14, wherein the at least one processor performs the presentation operation by formatting the data on the visual display as a function of the detected proximity of the user.

17. The apparatus of claim 16, wherein the at least one processor performs the formatting operation by sizing the data presented on the visual display as a function of the detected proximity of the user.

18. The apparatus of claim 17, wherein a size associated with the presented data is increased by the at least one processor as a distance measure assigned to the detected proximity of the user increases.

19. The apparatus of claim 17, wherein a size associated with the presented data is decreased by the at least one processor as a distance measure assigned to the detected proximity of the user decreases.

20. The apparatus of claim 16, wherein the at least one processor performs the formatting operation by adjusting content detail associated with the data presented on the visual display as a function of the detected proximity of the user.

21. The apparatus of claim 16, wherein a second user interface of the device is an audio speaker.

22. The apparatus of claim 24, wherein the at least one processor performs the presentation operation by causing an audible representation of the data to be presented at the audio speaker as a function of the detected proximity of the user.

23. The apparatus of claim 14, wherein the at least one processor performs the detection operation by determining whether the user is ine one of two or more zones with respect to the at least one user interface and the presentation operation by presenting the data in different modes depending on which zone the user is determined to be in.

24. The apparatus of claim 23, wherein the at least one user interface is a visual display and the presentation operation includes selecting different sizes for the presented data depending on which zone the user is determined to be in.

25. The apparatus of claim 26, wherein a second user interface is an audio speaker and the presentation operation includes causing an audible representation of the data to be presented at the audio speaker depending on which zone the user is determined to be in.

26. The apparatus of claim 14, wherein the at least one attribute is a biometric attribute.

* * * * *

UNITED STATES PATENT AND TRADEMARK OFFICE
CERTIFICATE OF CORRECTION

PATENT NO. : 6,971,072 B1
DATED : November 29, 2005
INVENTOR(S) : Mitchell Jay Stein It is certified that error appears in the above-identified patent and that said Letters Patent is hereby corrected as shown below:

Column 9,
Line 13, insert -- further -- after the word "step".
Line 20, replace claim 2 with the following:
-- The method of claim 1, wherein the at least one user interface is a visual display. --.
Line 22, replace claim 3 with the following:
-- The method of claim 2, wherein the presenting step further includes formatting the data on the visual display as a function of the detected proximity of the user. --.
Line 45, replace claim 4 with the following:
-- The method of claim 3, wherein the formatting step further includes sizing the data presented on the visual display as a function of the detected proximity of the user. --.
Line 50, delete "5" and insert -- 4 --.
Line 53, replace claim 7 with the following:
-- The method of claim 2, wherein the formatting step further includes adjusting content detail associated with the data presented on the visual display as a function of the detected proximity of the user. --.
Line 55, replace claim 8 with the following:
-- The method of claim 2, wherein a second user interface of the device is an audio speaker. --.
Line 60, replace claim 9 with the following:
-- The method of claim 8, wherein the presenting step further includes causing an audible representation of the data to be presented at the audio speaker as a function of the detected proximity of the user. --.
Line 63, insert -- in -- after "is".

Column 10,
Line 63, delete "24" and insert -- 21 --.

Column 11,
Line 3, delete "ine" and insert -- in --.

UNITED STATES PATENT AND TRADEMARK OFFICE
CERTIFICATE OF CORRECTION

PATENT NO. : 6,971,072 B1
DATED : November 29, 2005
INVENTOR(S) : Mitchell Jay Stein It is certified that error appears in the above-identified patent and that said Letters Patent is hereby corrected as shown below:

Column 12,
Line 1, delete "26" and insert -- 24 --.

Signed and Sealed this

Twenty-eighth Day of March, 2006

JON W. DUDAS
*Director of the United States Patent and Trademark Office*